US011085322B2

(12) United States Patent
Ha et al.

(10) Patent No.: US 11,085,322 B2
(45) Date of Patent: Aug. 10, 2021

(54) BORESCOPE PLUG SYSTEM

(71) Applicant: United Technologies Corporation, Farmington, CT (US)

(72) Inventors: Joon Ha, Glastonbury, CT (US); Konstantinos P. Giannakopoulos, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 121 days.

(21) Appl. No.: 16/151,795

(22) Filed: Oct. 4, 2018

(65) Prior Publication Data

US 2020/0109641 A1 Apr. 9, 2020

(51) Int. Cl.
*F01D 21/00* (2006.01)
*F01D 25/24* (2006.01)
*F16B 21/04* (2006.01)
*G01M 15/14* (2006.01)

(52) U.S. Cl.
CPC ........... *F01D 21/003* (2013.01); *F01D 25/24* (2013.01); *F16B 21/04* (2013.01); *G01M 15/14* (2013.01); *F05D 2220/32* (2013.01); *F05D 2260/80* (2013.01); *F05D 2260/83* (2013.01)

(58) Field of Classification Search
CPC .... F01D 21/003; F01D 25/24; F05D 2260/83; F05D 2220/32; F16B 21/04; G01M 15/14; B25B 13/48; B25B 13/481; B25G 1/04; B25G 1/043
See application file for complete search history.

(56) References Cited

U.S. PATENT DOCUMENTS 3,157,258 A * 11/1964 Cronholm ........... B25B 23/1427
192/48.5
4,591,794 A * 5/1986 Shattuck ............... F01D 21/003
324/457
5,690,006 A * 11/1997 Pulliam ............... B25B 23/0021
403/326

(Continued)

FOREIGN PATENT DOCUMENTS

CN 102235501 B 11/2013
WO 2018034986 A1 2/2018

OTHER PUBLICATIONS

EP search report for EP19189820.4 dated Apr. 29, 2020.

*Primary Examiner* — Woody A Lee, Jr.
*Assistant Examiner* — Eric A Lange
(74) *Attorney, Agent, or Firm* — Getz Balich LLC

(57) ABSTRACT

A borescope plug system includes a housing, a driver, and a spring. The housing includes a first housing end and a second housing end. The housing further includes a longitudinally extending centerline extending between the first housing end and the second housing end. The driver is disposed at least partially within the housing along the longitudinally extending centerline and includes a first driver end and a second driver end. The spring is disposed within the housing and couples the housing to the driver. The driver is configured to move within the housing, along the longitudinally extending centerline, to engage the first driver end with a borescope plug of a borescope plug port, and to install or remove the borescope plug from the borescope plug port based on a rotation of the driver about the longitudinally extending centerline.

19 Claims, 14 Drawing Sheets

(56) References Cited

U.S. PATENT DOCUMENTS

| | | | |
|---|---|---|---|
| 5,867,976 A * | 2/1999 | Ziegler, Jr. | ............ F01D 21/003 |
| | | | 415/118 |
| 8,505,418 B1 | 8/2013 | Chiang | |
| 9,512,737 B2 | 12/2016 | Hatcher, Jr. et al. | |
| 2007/0214916 A1 | 9/2007 | Lee | |
| 2018/0272514 A1 | 9/2018 | Pergantis | |

\* cited by examiner

BORESCOPE PLUG SYSTEM

This invention was made with Government support under awarded by the United States. The Government has certain rights in this invention.

BACKGROUND

1. Technical Field

This disclosure relates generally to maintenance tools for machinery, and more particularly to tools for borescope plug installation and removal.

2. Background Information

Inspection of gas turbine engines for maintenance or repairs may frequently require inspection of engine internal components with the aid of a borescope. Borescope plugs may be installed in multiple locations within the engine to permit borescope access once the borescope plug is removed (see, e.g., FIG. 1). The location of borescope plugs, however, may be inconvenient to technicians seeking to remove or install the plugs. In some cases, removal or installation of the borescope plug may be a "blind operation" (i.e., the technician can physically reach the borescope plug but, based on the plugs location, cannot visually observe the plug during the removal or installation).

The above orientation of borescope plugs within gas turbine engines can make maintenance and repairs of engines more difficult because of the threat of lost borescope plugs. For example, a technician attempting to blindly remove a borescope plug may inadvertently drop the plug and lose it inside of the air stream ducts or housing of the engine. Attempts to recover a lost borescope plug can result in reduced aircraft operational time and increased man-hours required for maintenance. More importantly, lost borescope plugs that are not recovered may result in extensive damage to the engine if the engine is subsequently returned to service with the borescope plug unsecured.

SUMMARY

According to an aspect of the present disclosure, a borescope plug system includes a housing, a driver, and a spring. The housing includes a first housing end and a second housing end. The housing further includes a longitudinally extending centerline extending between the first housing end and the second housing end. The driver is disposed at least partially within the housing along the longitudinally extending centerline and includes a first driver end and a second driver end. The first driver end and the second driver end have an orientation corresponding to the respective first housing end and second housing end. The spring is disposed within the housing and couples the housing to the driver. The driver is configured to move within the housing, along the longitudinally extending centerline, to engage the first driver end with a borescope plug of a borescope plug port, and to install or remove the borescope plug from the borescope plug port based on a rotation of the driver about the longitudinally extending centerline.

In the alternative or additionally thereto, in the foregoing aspect, the first housing end is configured to engage the borescope plug.

In the alternative or additionally thereto, in the foregoing aspect, the driver is a standard square driver.

In the alternative or additionally thereto, in the foregoing aspect, the first driver end includes at least one spring-loaded ball.

In the alternative or additionally thereto, in the foregoing aspect, the housing includes at least one guide aperture and the driver includes at least one guide pin. The at least one guide pin is located within a respective at least one guide aperture and is configured to travel longitudinally within the respective at least one guide aperture.

In the alternative or additionally thereto, in the foregoing aspect, a location of the at least one guide pin within the respective at least one guide aperture prevents rotation of the driver about the longitudinally extending centerline with respect to the housing.

In the alternative or additionally thereto, in the foregoing aspect, the borescope plug system further includes a guiding sleeve. The guiding sleeve includes a body having a first sleeve end, a second sleeve end, and an internal passage extending longitudinally between the first sleeve end and the second sleeve end. The guiding sleeve is configured to engage an adapter of the borescope plug port and at least partially encompass the housing within the internal passage.

According to another aspect of the present disclosure, a borescope plug system includes a guiding sleeve having a body. The body includes a first sleeve end, a second sleeve end, and an internal passage within the body extending between the first sleeve end and the second sleeve end along a longitudinally extending centerline. The guiding sleeve is configured to engage an adapter of a borescope plug port so as to guide a borescope plug to or from the borescope plug port during a respective installation or removal of the borescope plug from the borescope plug port.

In the alternative or additionally thereto, in the foregoing aspect, the borescope plug system further includes a driver configured to engage and install or remove the borescope plug from the borescope plug port via the internal passage of the guiding sleeve.

In the alternative or additionally thereto, in the foregoing aspect, the borescope plug system further includes a housing. The housing includes a first housing end, a second housing end, and a spring disposed within the housing and coupling the housing to the driver. The driver is disposed at least partially within the housing. The driver includes a first driver end and a second driver end. The first driver end and the second driver end have an orientation corresponding to the respective first housing end and the second housing end. The housing is configured to move along the longitudinally extending centerline within the internal passage of the guiding sleeve.

In the alternative or additionally thereto, in the foregoing aspect, the first housing end is configured to engage the borescope plug.

In the alternative or additionally thereto, in the foregoing aspect, the first driver end includes at least one spring-loaded ball.

In the alternative or additionally thereto, in the foregoing aspect, the housing includes at least one guide aperture and the driver includes at least one guide pin. The at least one guide pin is located within a respective at least one guide aperture and configured to travel longitudinally within the respective at least one guide aperture.

In the alternative or additionally thereto, in the foregoing aspect, a location of the at least one guide pin within the respective at least one guide aperture prevents rotation of the driver about the longitudinally extending centerline with respect to the housing.

According to another aspect of the present disclosure, a method for operating a borescope plug is provided. A housing, a driver, and a spring are provided. The housing includes a first housing end and a second housing end. The housing further includes a longitudinally extending centerline extending between the first housing end and the second housing end. The driver is disposed at least partially within the housing along the longitudinally extending centerline. The driver includes a first driver end and a second driver end. The first driver end and the second driver end have an orientation corresponding to the respective first housing end and the second housing end. The spring is disposed within the housing and couples the housing to the driver. The first driver end is engaged with a borescope plug of a borescope plug port by moving the driver within the housing along the longitudinally extending centerline. The driver is rotated about the longitudinally extending centerline to install or remove the borescope plug from the borescope plug port.

In the alternative or additionally thereto, in the foregoing aspect, the first housing end is engaged with the borescope plug.

In the alternative or additionally thereto, in the foregoing aspect, the driver is a standard square driver.

In the alternative or additionally thereto, in the foregoing aspect, the first driver end includes at least one spring-loaded ball.

In the alternative or additionally thereto, in the foregoing aspect, the housing includes at least one guide aperture and the driver includes at least one guide pin. The at least one guide pin is located within a respective at least one guide aperture and is configured to travel longitudinally within the respective at least one guide aperture.

In the alternative or additionally thereto, in the foregoing aspect, a location of the at least one guide pin within the respective at least one guide aperture prevents rotation of the driver about the longitudinally extending centerline with respect to the housing.

The present disclosure, and all its aspects, embodiments and advantages associated therewith will become more readily apparent in view of the detailed description provided below, including the accompanying drawings.

DETAILED DESCRIPTION

Figure 1:
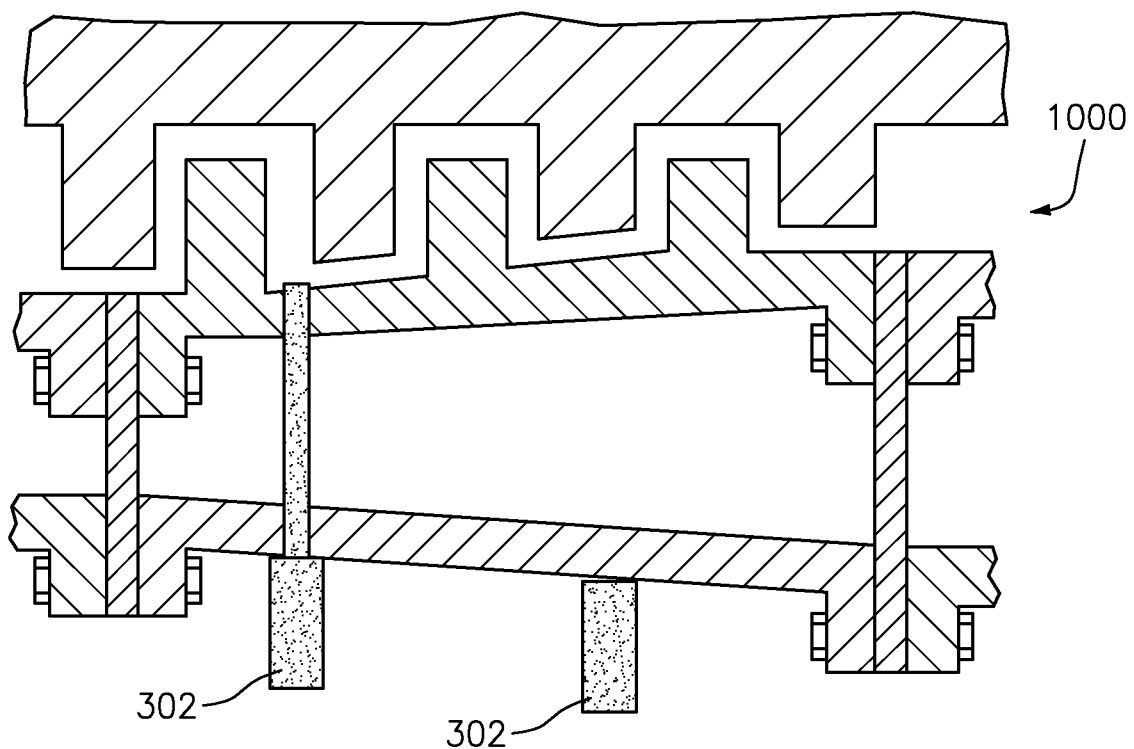
FIG. 1 is a schematic diagram of a gas turbine engine including borescope plug ports.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2A:
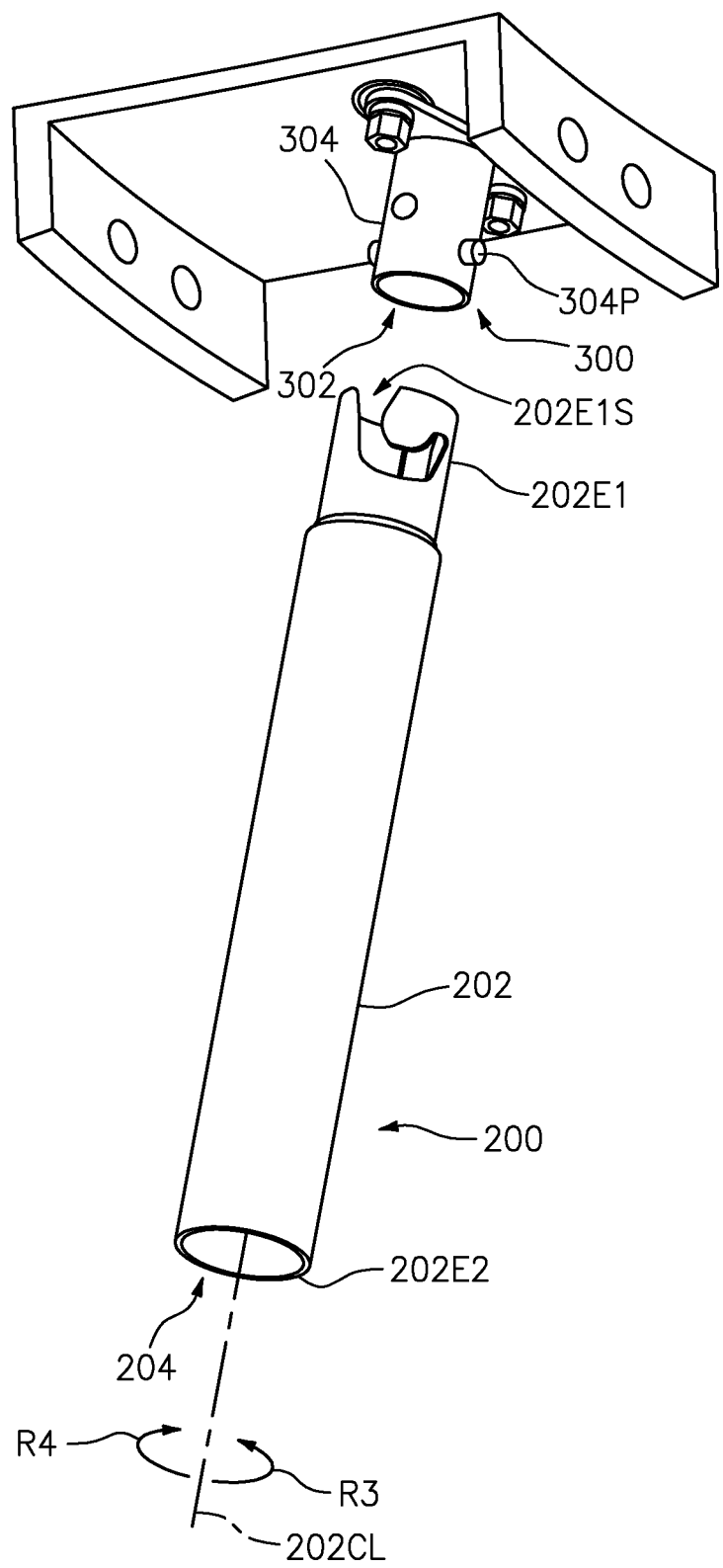
FIG. 2A is a perspective view of an exemplary guiding sleeve according to aspects of the present disclosure.
Figure 7:
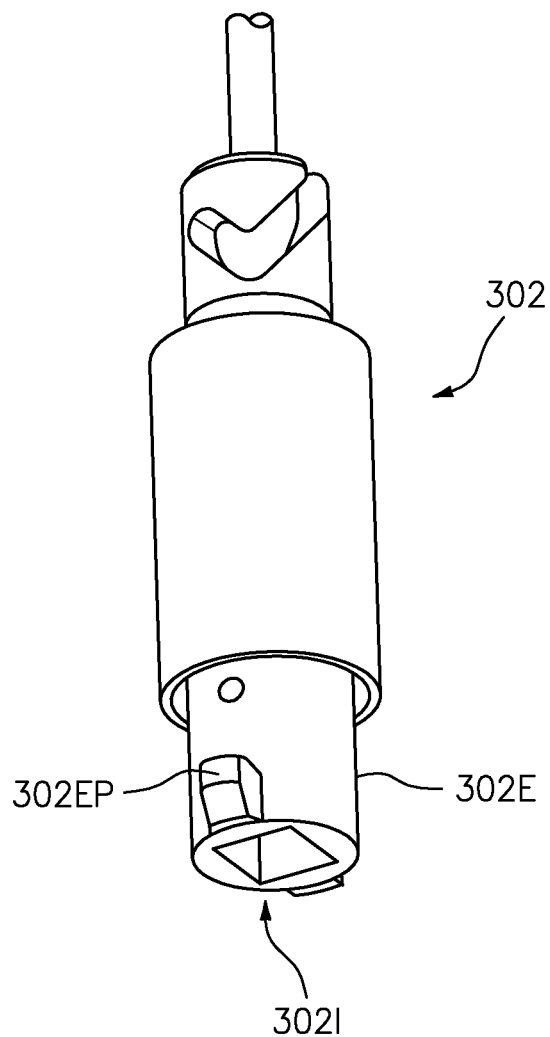
FIG. 7 is a perspective view of a borescope plug.

Referring to FIG. 1, a generalized illustration of an aircraft gas turbine engine including borescope plugs is shown. A gas turbine engine may include one or more borescope plug ports to facilitate inspection of gas turbine engine internal components using a borescope. Each of the borescope plug ports may be configured for receipt of a borescope plug configured to seal the respective borescope plug port. As will be discussed in greater detail, a borescope plug of a respective borescope plug port may be removed to facilitate inspection of gas turbine engine internal components by a technician. A borescope plug, such as borescope plug 302 as depicted in FIG. 7, is configured to be securely engaged within a borescope plug port, such as borescope plug port 300 as depicted in FIG. 2A. The borescope plug 302 may be secured within the borescope plug port 300 using, for example, complementary mating engagement with threads formed in the borescope plug port 300 or, alternatively, lugs or lug-receiving slots formed in the borescope plug 302 for twist-lock engagement with corresponding lugs or slots formed in a complimentary borescope plug port 300. Any known form of plug/port retention mechanisms may be utilized in connection with the borescope plug 302 and borescope plug port 300.

Figure 2B:
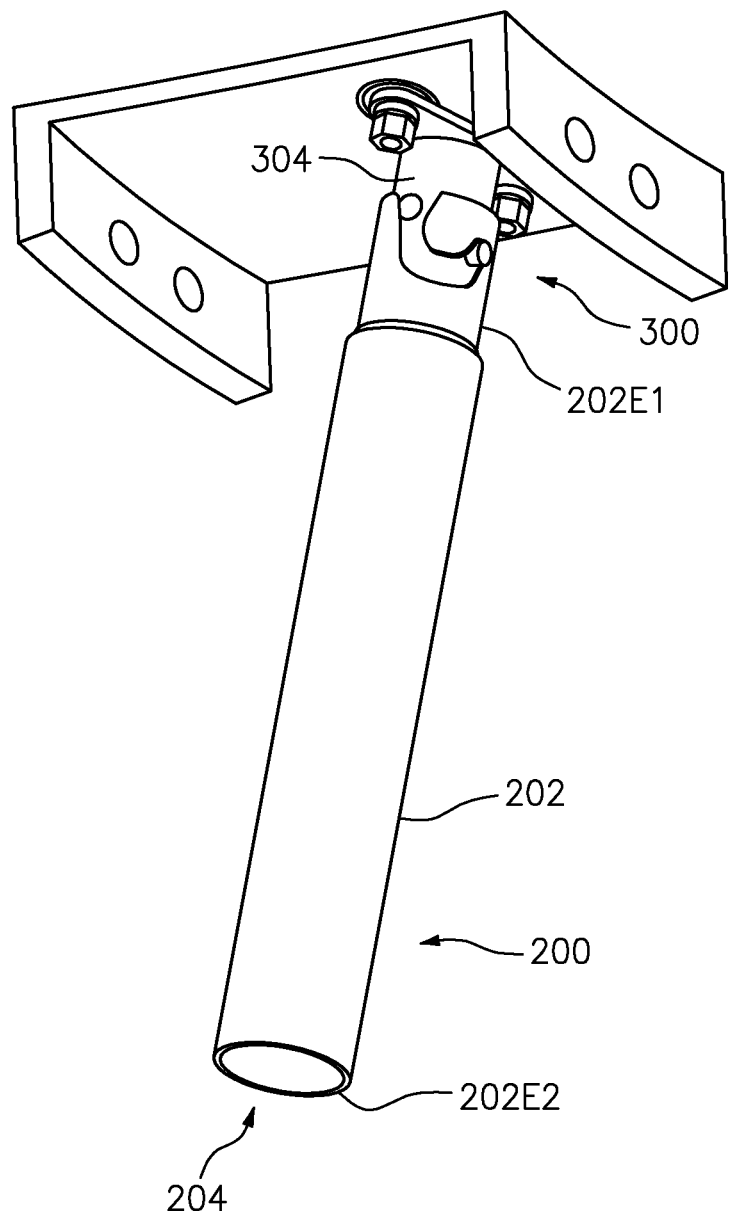
FIG. 2B is a perspective view of the guiding sleeve of FIG. 2A.
Figure 2C:
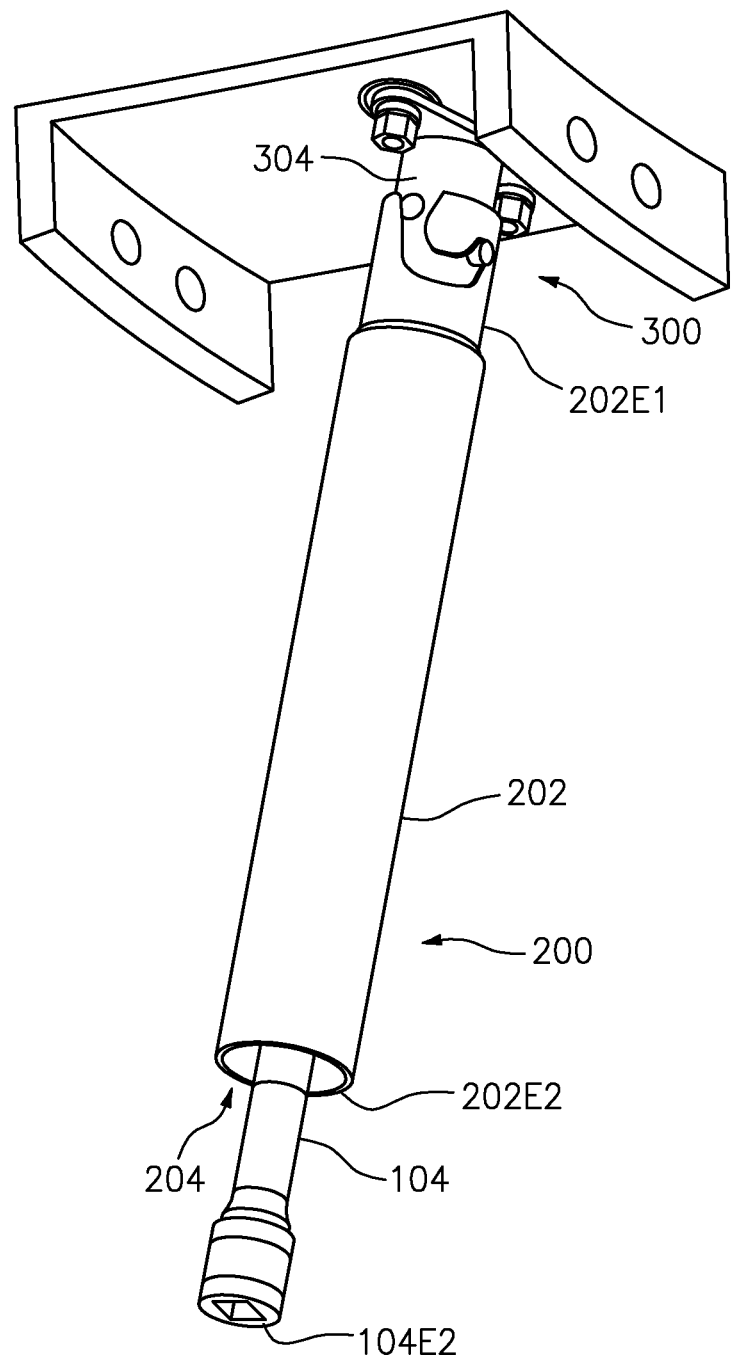
FIG. 2C is a perspective view of the guiding sleeve of FIG. 2A including a driver.
Figure 3:
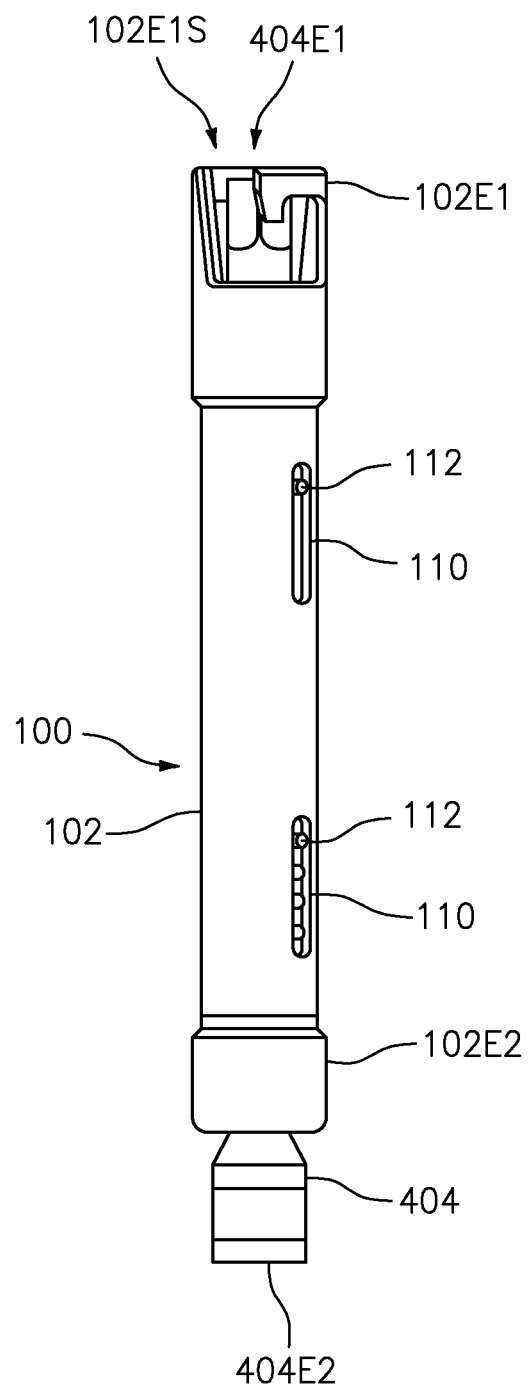
FIG. 3 is a side view of an exemplary borescope plug tool according to aspects of the present disclosure.
Figure 4:
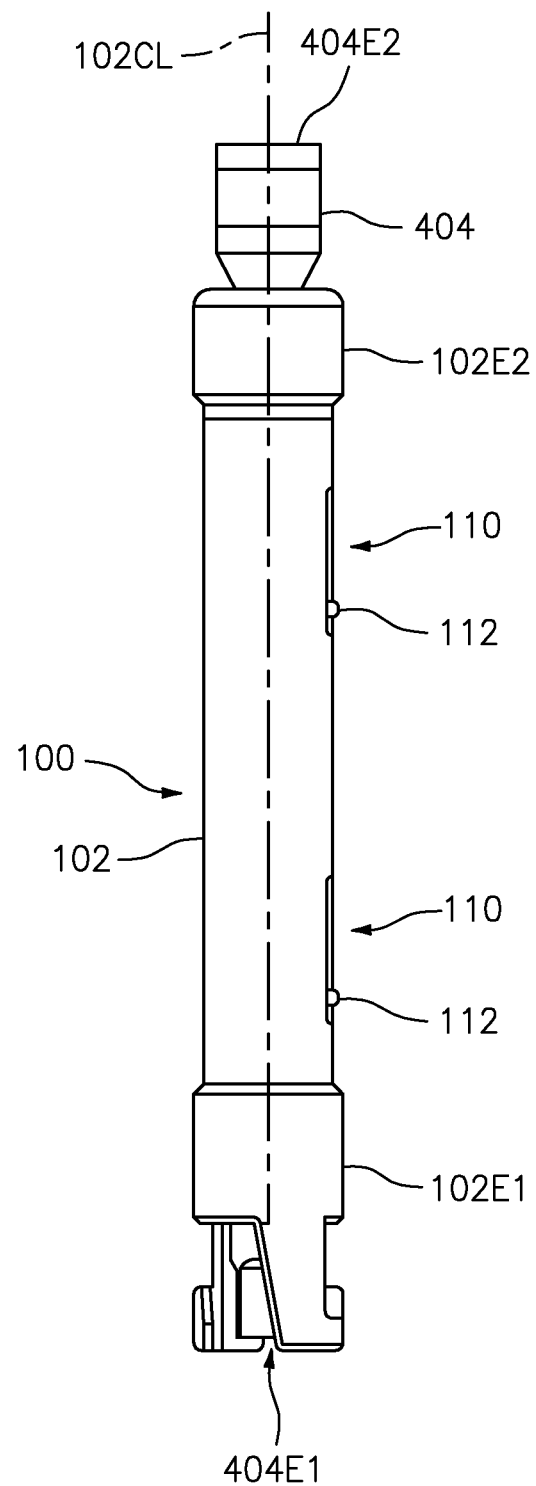
FIG. 4 is a side view of the borescope plug tool of FIG. 3.
Figure 5:
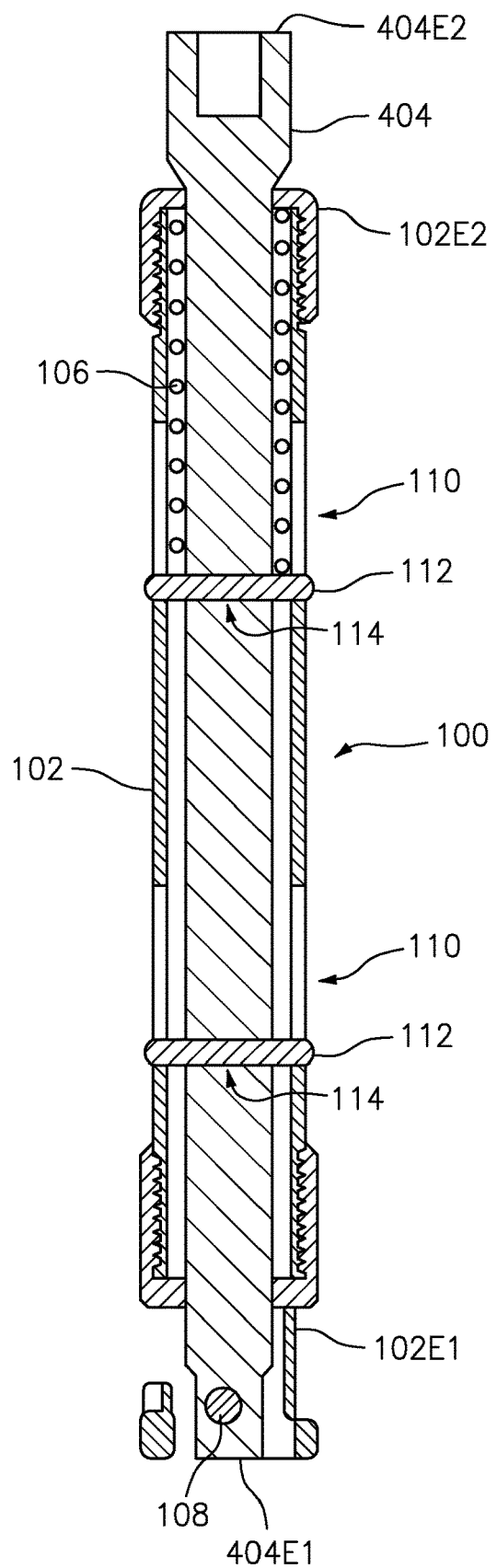
FIG. 5 is a cross-sectional side view of the borescope plug tool of FIG. 3
Figure 6:
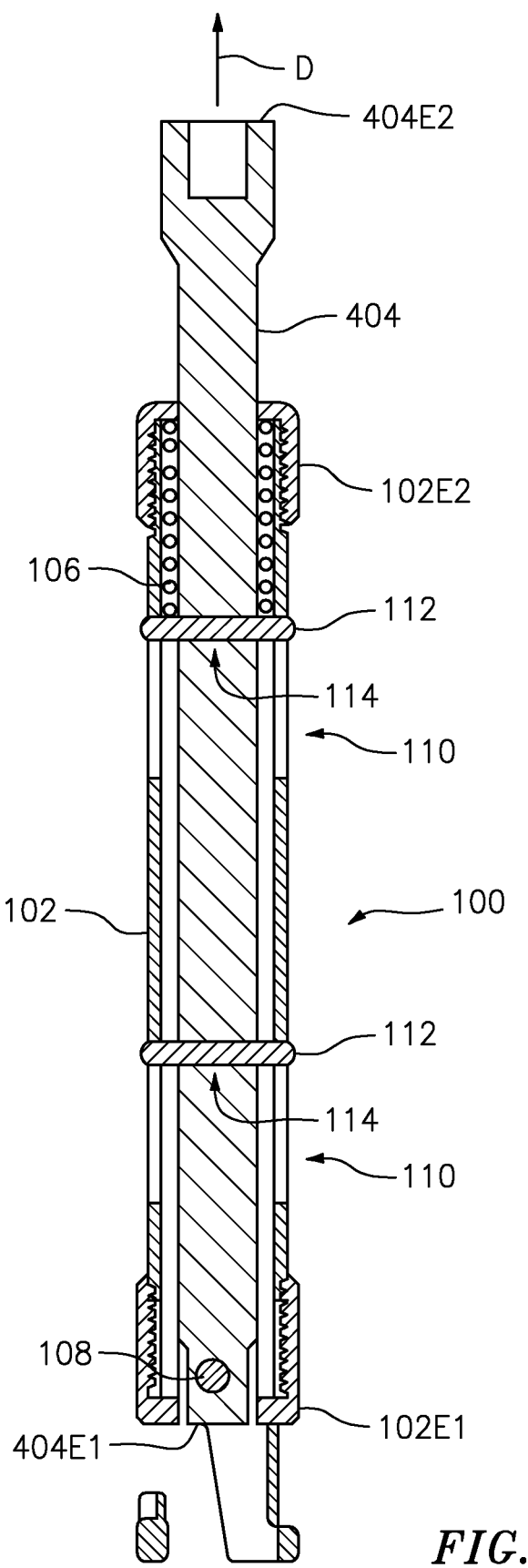
FIG. 6 is a cross-sectional side view of the borescope plug tool of FIG. 3 in a retracted position.

Referring to FIGS. 2A-2C, an exemplary guiding sleeve 200 according to aspects of the present disclosure is shown. The guiding sleeve 200 includes a body 202 having a first sleeve end 202E1, a second sleeve end 202E2, and an internal passage 204. The internal passage 204 extends between the first sleeve end 202E1 and the second sleeve end 202E2 along a longitudinally extending centerline 202CL. The body 202 may have, for example, a substantially cylindrical shape. The guiding sleeve 200 is configured to engage an adapter 304 of the borescope plug port 300 so as to guide a borescope plug 302 to or from the borescope plug port 300 during a respective installation or removal of the borescope plug 302 from the borescope plug port 300. While the exemplary guiding sleeve 200, as shown in FIGS. 2A-2C, is described with respect to use in aircraft gas turbine engines, the guiding sleeve 200 is not limited to use in aircraft and may be used with other engine types and configurations in other categories of vehicles. Furthermore, the guiding sleeve 200 may be used to facilitate borescope plug installation and removal in non-vehicle machinery (e.g., a turbine generator).

As can be seen in FIG. 2B, the first sleeve end 202E1 of the guiding sleeve 200 is configured to engage the adapter 304 of the borescope plug port 300 so as to provide secure alignment between the guiding sleeve 200 and the borescope plug port 300 while permitting access to the borescope plug 302 (not shown) of the borescope plug port 300 via the internal passage 204 of the guiding sleeve 200. Proper engagement between the guiding sleeve 200 and the borescope plug port 300 may be accomplished by, for example, twist-lock engagement between one or more slots 202E1S of the first sleeve end 202E1 and one or more pins 304P of the adapter 304. In other embodiments, proper engagement between the first sleeve end 202E1 and the adapter 304 may be accomplished by any suitable method, such as threaded engagement. In some embodiments, the length and/or width of the guiding sleeve 200 may vary depending on the characteristics of the relevant machinery (e.g., the gas turbine engine), for example, the size of the borescope plug 302 and the distance to the borescope plug 302 from a technician's access point. The guiding sleeve 200 may be made from any sufficiently rigid material, such as metal or plastic, to ensure proper engagement with the adapter 304 and access to the borescope plug 302 via the internal passage 204 of the guiding sleeve 200. In some embodiments, the guiding sleeve 200 may be made from a plurality of materials. For example, the first sleeve end 202E1 may be made from metal to facilitate secure engagement with the adapter 304 while the body 202 of the guiding sleeve 200 may be made from a second material, such as plastic. In still other embodiments, the guiding sleeve 200 may include both rigid and non-rigid materials. For example, the first sleeve end 202E1 may be made from metal to facilitate secure engagement with the adapter 304 while the body 202 of the guiding sleeve 200 may be made from a second non-rigid material, such as fabric or flexible plastic hose.

Figure 8:
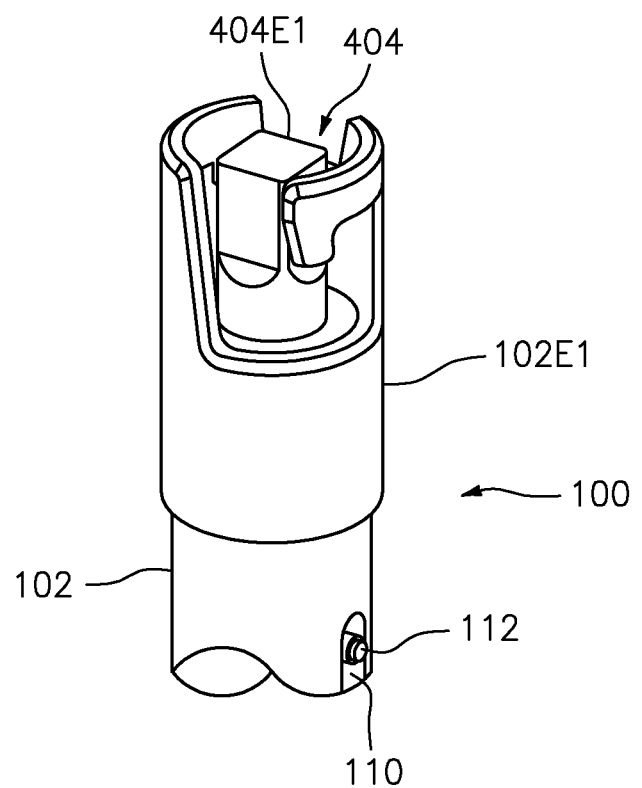
FIG. 8 is a perspective view of an end of the borescope plug tool of FIG. 3.
Figure 9:
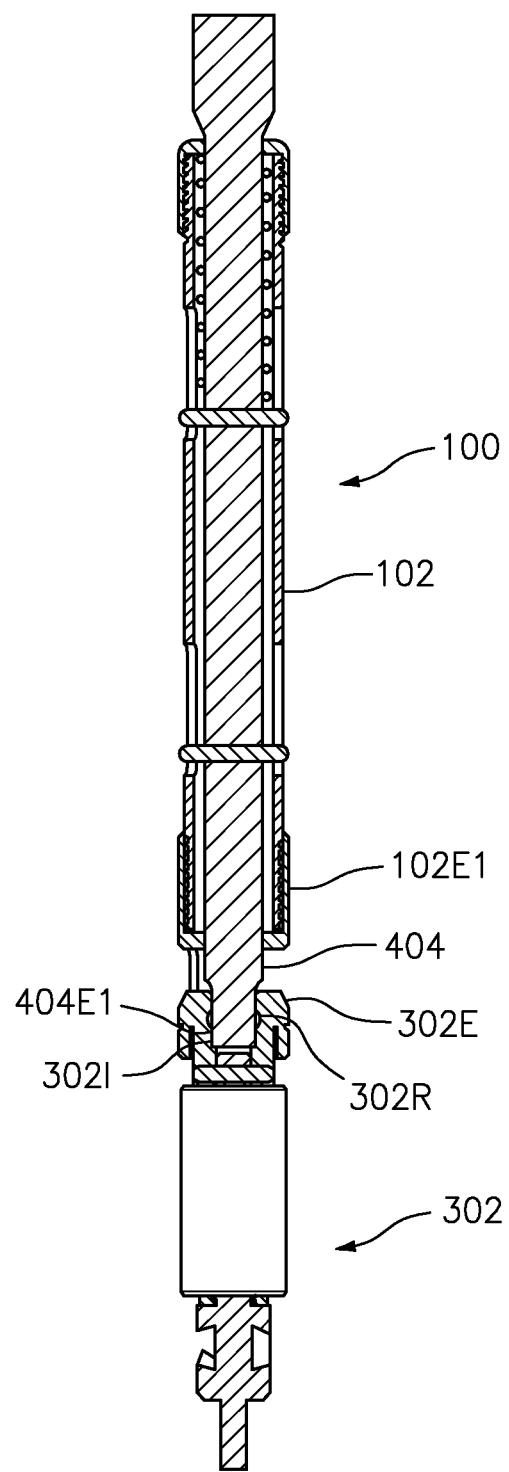
FIG. 9 is a cross-sectional side view of the borescope plug tool of FIG. 3 engaging the borescope plug port of FIG. 7.
Figure 10:
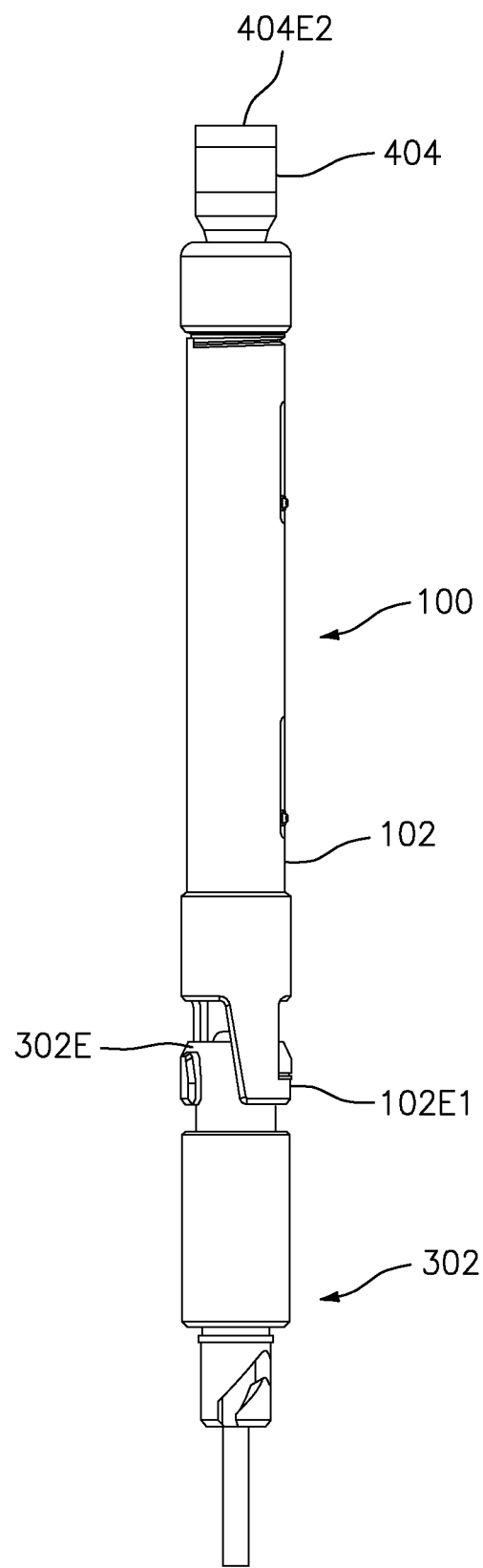
FIG. 10 is a side view of the borescope plug tool of FIG. 3 engaging the borescope plug of FIG. 7.
Figure 11:
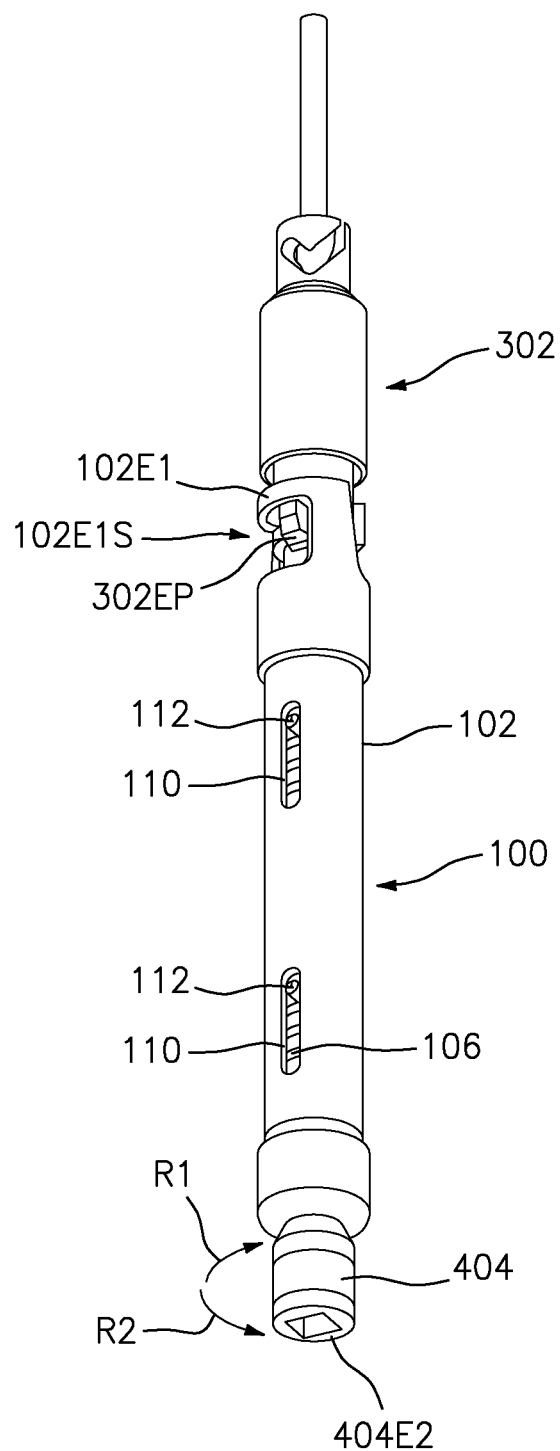
FIG. 11 is a perspective view of the borescope plug tool of FIG. 3 engaging the borescope plug port of FIG. 7.

As can be seen in FIG. 2C, engagement of the guiding sleeve 200 with the borescope plug port 300 may facilitate operation of the borescope plug 302 (not shown) by a tool, such as driver 104, via the internal passage 204 of the guiding sleeve 200. Driver 104 includes a first driver end 104E1 (not shown, substantially similar to 404E1 as shown in FIG. 8) and a second driver end 104E2. Additionally, driver 104 may be a standard square driver, or any other driver configured to install or remove a borescope plug 302. As will be discussed in greater detail, other tools may be used for installation and removal of the borescope plug 302. The alignment of the guiding sleeve 200 with the borescope plug port 300, as shown in FIG. 2C, creates a secure path for the borescope plug 302 during installation or removal from the borescope plug port 300. For example, any borescope plug 302 inadvertently dropped from a tool, such as driver 104, will be contained in or directed through the guiding sleeve 200, depending on the orientation of the guiding sleeve 200 (e.g., vertical, horizontal, etc.). The alignment of the guiding sleeve 200 with the borescope plug port 300 may also facilitate engagement between the driver 104 and the borescope plug 302 by directing the driver 104 towards the borescope plug 302 (e.g., a technician attempting to blindly remove a borescope plug 302).

Still referring to FIGS. 2A-2C, the following non-limiting method is provided to illustrate how the guiding sleeve 200 according to aspects of the present disclosure may facilitate borescope plug 302 installation and removal. A technician may direct the guiding sleeve 200 towards the borescope plug port aligning the one or more slots 202E1S of the first sleeve end 202E1 with the one or more pins 304P of the adapter 304. The guiding sleeve 200 is engaged with the borescope plug port 300 by twisting the guiding sleeve 200, in direction R3 for example (i.e., counter-clockwise), to establish twist-lock engagement between the first sleeve end 202E1 and the adapter 304. A tool, such as driver 104, is inserted into the internal passage 204 of the guiding sleeve 200 to engage the borescope plug 302, such as by engaging an interior surface 302I (not shown) of the borescope plug 302. Driver 104 is rotated clockwise or counter-clockwise as necessary to install or remove the borescope plug 302. The driver 104 is removed from the internal passage 204 of the guiding sleeve 200 along with the borescope plug 302 (if removing the borescope plug). The guiding sleeve 200 is then removed from the borescope plug port using a twist motion in a direction opposite that of the installation, in direction R4 for example (i.e., clockwise).

Referring now to FIGS. 3-6 and 8-12, an exemplary borescope plug tool 100 according to aspects of the present disclosure is illustrated. The borescope plug tool 100 generally includes a housing 102, a driver 404, and a spring 106. As will be discussed in greater detail, in some embodiments, the borescope plug tool 100 and the guiding sleeve 200 may provide a common interface to effect installation or removal of a borescope plug 302 from a borescope plug port 300. In other embodiments, the borescope plug tool 100 may be used independent of the guiding sleeve 200 to effect installation or removal of a borescope plug 302 from a borescope plug port 300.

The housing 102 includes a first housing end 102E1, a second housing end 102E2, and a longitudinally extending centerline 102CL extending between the first housing end 102E1 and the second housing end 102E2. The driver 404 includes a first driver end 404E1 and a second driver end 404E2. Driver 404 is disposed at least partially within the housing 102 along the longitudinally extending centerline 102CL, with the first driver end 404E1 and the second driver end 404E2 having an orientation corresponding to the respective first housing end 102E1 and second housing end 102E2. Spring 106 is disposed within the housing 102 and couples the housing 102 to the driver 404. The driver 404 is configured to move within the housing 102 along the longitudinally extending centerline 102CL to engage the borescope plug 302 of the borescope plug port 300, such as by engaging the first driver end 404E1 with an interior surface 302I of the borescope plug 302. For example, the second driver end 404E2 of the driver 404 may be pulled in direction D, against a force of the spring 106, into a retracted position (see FIG. 6) to facilitate engagement between the borescope plug tool 100 and the borescope plug 302. When the driver 404 is released, the force of the spring 106 will return the driver 404 to its nominal position (see FIGS. 3-5). Once the driver is engaged with the borescope plug 302, rotation of the driver 104 in direction R1, R2 about the longitudinally extending centerline 102CL effects installation or removal of the borescope plug 302 from the borescope plug port 300.

In some embodiments, the first housing end 102E1 may be configured to engage the borescope plug 302, such as by engaging an exterior surface 302E, to secure the borescope plug 302 to the borescope plug tool 100. Proper engagement between the first housing end 102E1 of the housing 102 and the borescope plug 300 may be accomplished by, for example, twist-lock engagement between one or more slots 102E1S of the first housing end 102E1 and one or more pins 302EP of the borescope plug 302. In other embodiments, proper engagement between the first housing end 102E1 and the borescope plug 302 may be accomplished by any suitable method, such as threaded engagement. Engagement of the borescope plug 302 to the borescope plug tool 100 ensures the borescope plug 302 is secured (i.e., prevented from being dropped) as the borescope plug 302 is in the process of being inserted or removed from the borescope plug port 300. In some embodiments, one or both of the first housing end 102E1 and the second housing end 102E2 are removable from the housing 102. One or both of the first housing end 102E1 and the second housing end 102E2 may be coupled to the housing by, for example, threaded engagement or any other suitable method. Removal of one or both of the first housing end 102E1 and the second housing end 102E2 may facilitate multiple configurations of the borescope plug tool 100. For example, the second housing end 102E2 may be removed to allow an alternative driver (e.g., one having a different sized or shaped engagement surface), other than driver 404, to be installed in the borescope plug tool 100.

As discussed above, the driver 404 may engage the borescope plug 302 when released from the retracted position to the nominal position within the housing 102. As with driver 104, driver 404 may be a standard square driver, or any other driver configured to install or remove a borescope plug 302. In some embodiments, the driver 104, 404 may include at least one spring-loaded ball 108 disposed on the first driver end 104E1, 404E1 (see FIG. 5). The at least one spring-loaded ball and a corresponding at least one recess 302R, disposed on the interior surface 302I of the borescope plug 302 (see FIG. 9) may operate together to provide more secure engagement between the first driver end 104E1, 404E1 and the borescope plug 302.

In some embodiments, the housing 102 may include at least one guide aperture 110 and the driver 404 may include a respective at least one guide pin 112 located within the at least one guide aperture 110 and configured to travel longitudinally within the at least one guide aperture 110. The at least one guide pin 112 may be disposed within a respective at least one pin aperture 114 extending through the driver 404 in a radial direction with respect to the longitudinally extending centerline 102CL (see FIG. 6). The orientation of the at least one guide pin 112 within the respective at least one guide aperture 110 substantially prevents relative motion between the housing 102 and the driver 404 with respect to the longitudinally extending centerline 102CL. Thus, rotation of the driver 404 in direction R1, R2 about the longitudinally extending centerline 102CL will effect a similar rotation of the housing 102 about the longitudinally extending centerline 102CL, and vice versa.

This alignment between the housing 102 and the driver 404 facilitates engagement of the housing 102 with the borescope plug 302 when removing the borescope plug 302 (i.e., the rotational motion of the driver 404 required to remove the borescope plug 302 is the same rotational motion of the housing 102 required to engage and secure the borescope plug 302). The at least one guide aperture 110 and respective at least one guide pin 112 facilitate proper engagement of the driver 404 with the borescope plug 302 by providing the technician with visual and/or haptic feedback of the driver 404 position. For example, when the driver 404 is properly engaged with the borescope plug 302, the at least one guide pin 112 may be oriented at a substantially forward-most (i.e., towards the borescope plug 302) longitudinal position within the respective at least one guide aperture 110. Additionally, in some embodiments, one of the at least one guide pins 112 may be in communication with the spring 106 so as to provide compressive force to the spring 106 when the driver 404 is pulled in direction D.

Referring to FIGS. 6 and 9-11, the following non-limiting method is provided to illustrate how the borescope plug tool 100 according to aspects of the present disclosure may facilitate borescope plug 302 installation and removal. To remove a borescope plug 302 from a borescope plug port 300, a technician may direct the borescope plug tool 100 towards the borescope plug 302 and align the one or more slots 102E1S of the first housing end 102E1 with the one or more pins 302EP of the borescope plug 302 while pulling the driver 404 in direction D into a retracted position against the force of the spring 106 (see FIG. 6). As will be apparent to one of ordinary skill in the art, during alignment of the first housing end 102E1 with the borescope plug 302, misalignment between the borescope plug 302 and the first driver end 404E1 may push the driver 404 into the retracted position, thus, it may be unnecessary for the technician to pull the driver 404 in direction D. While driver 404 is in a retracted position, the housing 102 is engaged with the borescope plug 302 by rotating the housing 102 or the driver 104, in direction R2 for example (i.e., counter-clockwise), to establish twist-lock engagement between the first housing end 102E1 and the exterior surface 302E of the borescope plug 302. Driver 404 is then released, causing the spring 106 force to return the driver 404 to the nominal position, thereby engaging the first driver end 104E1 with the interior surface 302I of the borescope plug 302 (see FIG. 9). Continuing to rotate the housing 102 or the driver 404, in direction R2, will apply a torque to the borescope plug 302 with respect to the borescope plug port 300, thus rotating and subsequently disengaging the borescope plug 302 from the borescope port 300.

Installation of a borescope plug 302 into a borescope plug port 300 may be accomplished in a manner similar to that discussed above with respect to removal of the borescope plug 302. The borescope plug 302 is secured to the housing 102 by directing the borescope plug tool 100 towards the borescope plug 302 and aligning the one or more slots 102E1S of the first housing end 102E1 with the one or more pins 302EP of the borescope plug 302 while pulling the driver 404 in direction D into a retracted position against the force of the spring 106 (see FIG. 6). While driver 404 is in a retracted position, the housing 102 is engaged with the borescope plug 302 by rotating the housing 102 or the driver 104, in direction R2 for example, to establish twist-lock engagement between the first housing end 102E1 and the exterior surface 302E of the borescope plug 302. Driver 404 is then released, causing the spring 106 force to return the driver 404 to the nominal position, thereby engaging the first driver end 404E1 with the interior surface 302I of the borescope plug 302 (see FIG. 9). The borescope plug 302 is inserted into the borescope plug port 300. Rotating the housing 102 or the driver 404, in direction R1 for example (i.e., clockwise), will apply a torque to the borescope plug 302 with respect to the borescope plug port, thus rotating and subsequently engaging the borescope plug 302 within the borescope port 300. Continuing to rotate the housing 102 or the driver 404 in direction R1 while pulling the driver 404 in direction D into a retracted position against the force of the spring 106 will disengage the first housing end 102E1 of the borescope plug tool 100 from the borescope plug 302.

Figure 12:
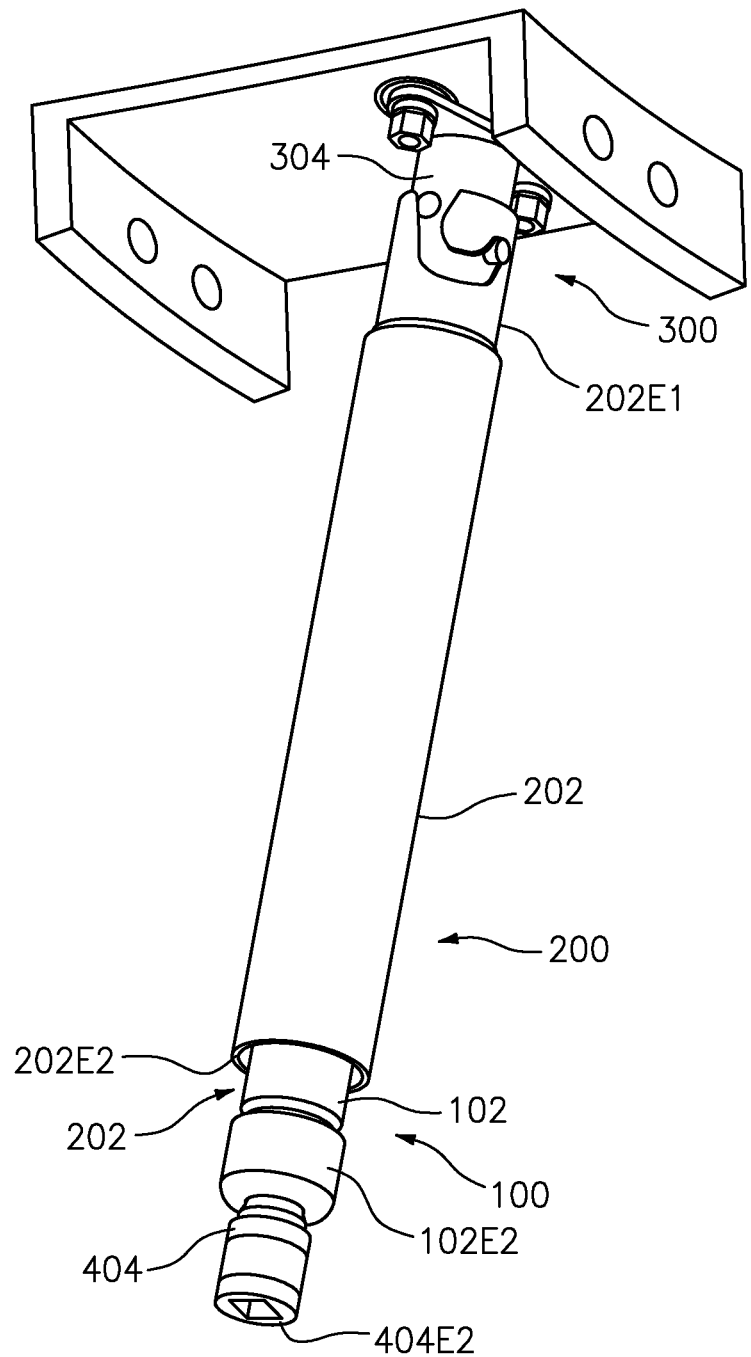
FIG. 12 is a perspective view of the borescope plug tool of FIG. 3 integrated with the guiding sleeve of FIG. 2A.

FIG. 12 illustrates an exemplary embodiment of the guiding sleeve 200 and the borescope plug tool 100 forming a common interface to effect installation or removal of a borescope plug 302. The internal passage 204 of the guiding sleeve 200 is configured to at least partially encompass the borescope plug tool 100 (i.e., the internal passage 204 has a large enough diameter to allow the housing 102 of the borescope plug tool 100 to access and engage the borescope plug 302 via the internal passage 204). Operation of the guiding sleeve 200 and the borescope plug tool 100 to install or remove a borescope plug 302 is substantially the same as described above with respect to independent operation of the guiding sleeve 200 and the borescope plug tool 100, individually.

As one of ordinary skill in the art will appreciate, installation or removal of a borescope plug 302, as described above with respect to operation of one or more of the guiding sleeve 200, driver 104, and borescope plug tool 100, can be accomplished by a technician using a single hand.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A borescope plug tool comprising:
   a housing comprising a first housing end and a second housing end, the housing further comprising a longitudinally extending centerline extending between the first housing end and the second housing end, the first housing end comprising at least one grip member defining at least one respective slot extending axially through the first housing end;
   a driver disposed at least partially within the housing along the longitudinally extending centerline and comprising a first driver end and a second driver end, the first driver end and the second driver end having an orientation corresponding to the respective first housing end and second housing end; and
   a spring, disposed within the housing, and coupling the housing to the driver, the driver extending through the spring with the first driver end located on a first axial side of the spring and the second driver end located on a second axial side of the spring and axially outside of the housing;
   wherein the driver is configured to move within the housing, along the longitudinally extending centerline, to engage the first driver end with a borescope plug of a borescope plug port, and to install or remove the borescope plug from the borescope plug port based on a rotation of the driver about the longitudinally extending centerline.

2. The borescope plug tool of claim 1, wherein the at least one grip member of the first housing end is configured to engage at least one respective pin of the borescope plug such that the at least one respective pin is retained within the at least one respective slot.

3. The borescope plug tool of claim 1, wherein the driver is a standard square driver.

4. The borescope plug tool of claim 1, wherein the first driver end comprises at least one spring-loaded ball.

5. The borescope plug tool of claim 1, wherein the housing comprises at least one guide aperture and the driver comprises at least one guide pin, the at least one guide pin located within a respective at least one guide aperture and configured to travel longitudinally within the respective at least one guide aperture.

6. The borescope plug tool of claim 5, wherein a location of the at least one guide pin within the respective at least one guide aperture prevents rotation of the driver about the longitudinally extending centerline with respect to the housing.

7. The borescope plug tool of claim 1 further comprising a guiding sleeve comprising a body including a first sleeve end, a second sleeve end, and an internal passage extending longitudinally between the first sleeve end and the second sleeve end, wherein the guiding sleeve is configured to engage an adapter of the borescope plug port and at least partially encompass the housing within the internal passage.

8. The borescope plug tool of claim 1, further comprising:
   a guiding sleeve comprising a body, the body including:
      a first sleeve end comprising at least one port grip member defining at least one respective port slot,
      a second sleeve end, and
      an internal passage within the body extending between the first sleeve end and the second sleeve end along a longitudinally extending centerline;
   wherein the guiding sleeve is configured to directly engage an adapter of a borescope plug port, with the at least one port grip member and to allow the housing to move within the internal passage, so as to guide a borescope plug to or from the borescope plug port during a respective installation or removal of the borescope plug from the borescope plug port.

9. The borescope plug tool of claim 8, wherein the first driver end comprises at least one spring-loaded ball.

10. The borescope plug tool of claim 8, wherein the housing comprises at least one guide aperture and the driver comprises at least one guide pin, the at least one guide pin located within a respective at least one guide aperture and configured to travel longitudinally within the respective at least one guide aperture.

11. The borescope plug tool of claim 10, wherein a location of the at least one guide pin within the respective at least one guide aperture prevents rotation of the driver about the longitudinally extending centerline with respect to the housing.

12. The borescope plug tool of claim 1, wherein the driver is axially moveable between a nominal position and a retracted position and wherein the spring biases the driver in the nominal position.

13. The borescope plug tool of claim 12, wherein the first driver end is located axially coincident with the at least one grip member of the housing with the driver in the nominal position and wherein the first driver end is axially separated from the at least one grip member of the housing in a direction toward the second housing end with the driver in the retracted position.

14. A method for operating a borescope plug with a borescope plug tool, the method comprising:
   providing a housing comprising a first housing end and a second housing end, the housing further comprising a longitudinally extending centerline extending between the first housing end and the second housing end, the first housing end comprising at least one grip member defining at least one respective slot extending axially through the first housing end;
   providing a driver disposed at least partially within the housing along the longitudinally extending centerline and comprising a first driver end and a second driver end, the first driver end and the second driver end having an orientation corresponding to the respective first housing end and second housing end;

providing a spring, disposed within the housing, and coupling the housing to the driver, the driver extending through the spring with the first driver end located on a first axial side of the spring and the second driver end located on a second axial side of the spring and axially outside of the housing;

engaging the first driver end with a borescope plug of a borescope plug port by moving the driver within the housing along the longitudinally extending centerline; and rotating the driver about the longitudinally extending centerline to install or remove the borescope plug from the borescope plug port.

15. The method of claim 14, further comprising engaging the at least one grip member of the first housing end with at least one respective pin of the borescope plug such that the at least one respective pin is retained within the at least one respective slot.

16. The method of claim 14, wherein the driver is a standard square driver.

17. The method of claim 14, wherein the first driver end comprises at least one spring-loaded ball.

18. The method of claim 14, wherein the housing comprises at least one guide aperture and the driver comprises at least one guide pin, the at least one guide pin located within a respective at least one guide aperture and configured to travel longitudinally within the respective at least one guide aperture.

19. The method of claim 18, wherein a location of the at least one guide pin within the respective at least one guide aperture prevents rotation of the driver about the longitudinally extending centerline with respect to the housing.

* * * * *